United States Patent
Cuva et al.

(10) Patent No.: US 7,117,680 B2
(45) Date of Patent: Oct. 10, 2006

(54) COOLING SCHEME FOR SCRAMJET VARIABLE GEOMETRY HARDWARE

(75) Inventors: William J. Cuva, Jupiter, FL (US); Donald E. Paulus, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 217 days.

(21) Appl. No.: 10/829,890

(22) Filed: Apr. 22, 2004

(65) Prior Publication Data

US 2005/0235629 A1 Oct. 27, 2005

(51) Int. Cl.
*F02K 7/14* (2006.01)
*F02C 7/042* (2006.01)

(52) U.S. Cl. .......................................... 60/768; 60/267
(58) Field of Classification Search .................. 60/767, 60/768, 267
See application file for complete search history.

(56) References Cited

U.S. PATENT DOCUMENTS

| | | | | |
|---|---|---|---|---|
| 3,407,603 A * | 10/1968 | Kelley et al. | .................. | 60/767 |
| 3,669,811 A * | 6/1972 | Jarvis et al. | ................. | 156/475 |
| 5,116,251 A * | 5/1992 | Bichler et al. | ................. | 60/768 |
| 6,109,038 A * | 8/2000 | Sharifi et al. | .................. | 60/737 |
| 7,000,398 B1 * | 2/2006 | Bouchez et al. | ............... | 60/767 |

* cited by examiner

*Primary Examiner*—Ted Kim
(74) *Attorney, Agent, or Firm*—Bachman & LaPointe, P.C.

(57) ABSTRACT

A cooling system for use in an engine having an element to be cooled includes at least one cooling channel on a first side of the element, at least one cooling channel on a second side of the element, and the at least one cooling channel on the first side communicating with the at least one channel on the second side in a nose region of the element so as to form a cooling circuit. The cooling system has particular utility in cooling interior and exterior surfaces of a movable cowl inlet flap used in a scramjet engine.

20 Claims, 7 Drawing Sheets

COOLING SCHEME FOR SCRAMJET VARIABLE GEOMETRY HARDWARE

STATEMENT OF GOVERNMENT INTEREST

The Government of the United States of America may have rights in the present invention as a result of Contract No. F33615-96-C-2694 awarded by the U.S. Department of the Air Force.

BACKGROUND OF THE INVENTION (1) Field of the Invention

The present invention relates to a cooling system for use in an engine having a movable element which requires cooling. The cooling system of the present invention has particular utility in scramjet engines where a movable cowl inlet flap requires cooling.

(2) Prior Art

As supersonic combustion ram jet (scramjet) engine technology continues to develop, an important goal will be to improve the propulsion system's operability and performance. One method of achieving this goal is to incorporate variable geometry into the engine flowpath design. Variable geometry allows for real time optimization of the engine flowpath lines for varying flight conditions. Incorporating a movable cowl inlet flap is one method of achieving variable geometry in a scramjet engine.

The operating environment of the cowl flap requires the metallic flowpath surface of the flap to be actively cooled. Since the flight trajectory of a hypersonic vehicle can include a number of different cowl flap positions, a significant heat load can be generated on the exterior surface as well. As a result, both interior and exterior surfaces of the flap require active cooling.

Designing a movable cowl flap for a scramjet engine presents many challenges. Actively cooling the flap structure represents one of these challenges.

SUMMARY OF THE INVENTION

Accordingly, it is an object of the present invention to provide a system for actively cooling an element on an engine.

It is a further object of the present invention to provide a cooling system which allows substantially uniform coolant flow distribution and collection through a movable element with substantially no stagnant or cooling starved areas.

It is still a further object of the present invention to provide a cooling system which has particular utility in cooling a movable cowl inlet flap used in a scramjet engine.

The foregoing objects are attained by the cooling system of the present invention.

In accordance with the present invention, a cooling system for use in an engine having an element to be cooled is provided. The cooling system broadly comprises at least one cooling channel on a first side of the element, at least one cooling channel on a second side of the element, and the at least one cooling channel on the first side communicates with the at least one channel on the second side in a nose region of the element so as to form a cooling circuit.

The cooling system of the present invention has particular utility in cooling interior and exterior surfaces of a movable cowl inlet flap used in a scramjet engine.

Other details of the cooling scheme for scramjet variable geometry hardware of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
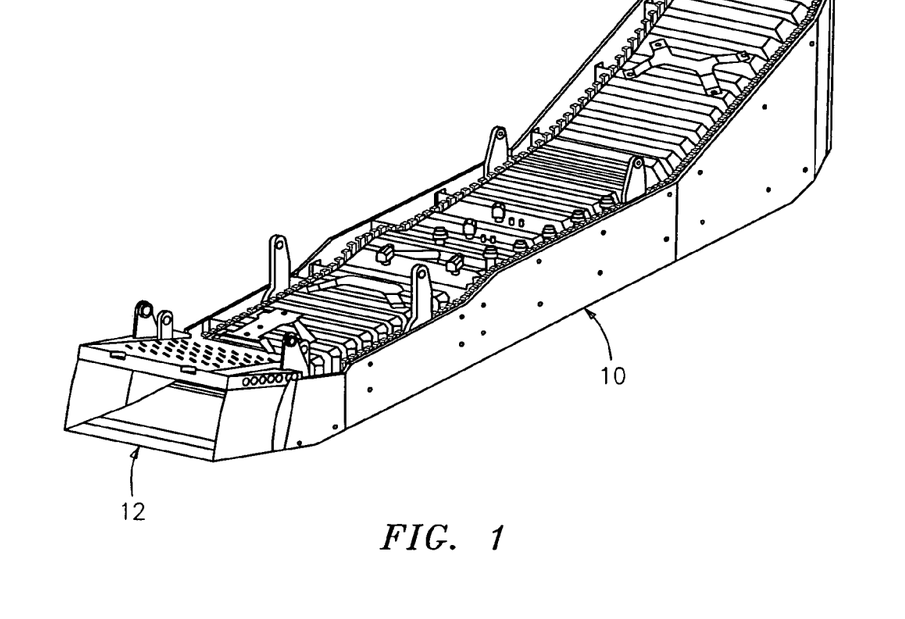
FIG. 1 is a schematic representation of a scramjet engine having a movable cowl inlet flap.

Referring now to the drawings, FIG. 1 illustrates a scramjet engine 10 having a movable cowl inlet flap 12.

Figure 2:
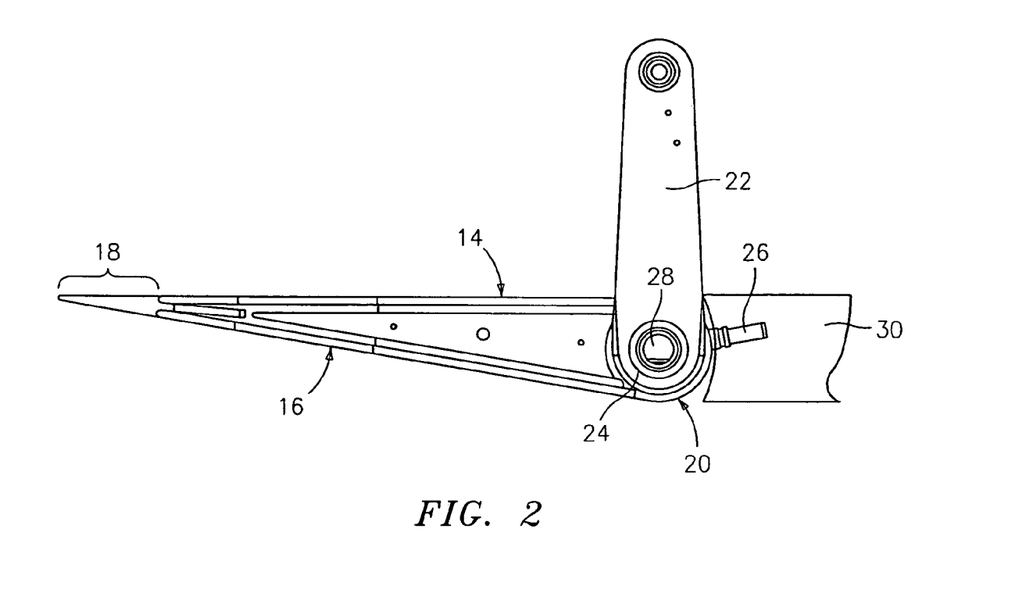
FIG. 2 is a side view of a cowl flap.

As can be seen in FIG. 2, the movable cowl inlet flap 12 is a wedge shaped structure having actively cooled internal and external flowpath panels 14 and 16 respectively. A passively cooled composite structure 18 comprises the flap leading edge. Sandwiched between the actively cooled internal and external panels 14 and 16 are laterally and axially directed stringers (not shown). The stringers interface with a torque tube 20 to form the primary structural components of the flap 12.

Figure 3:
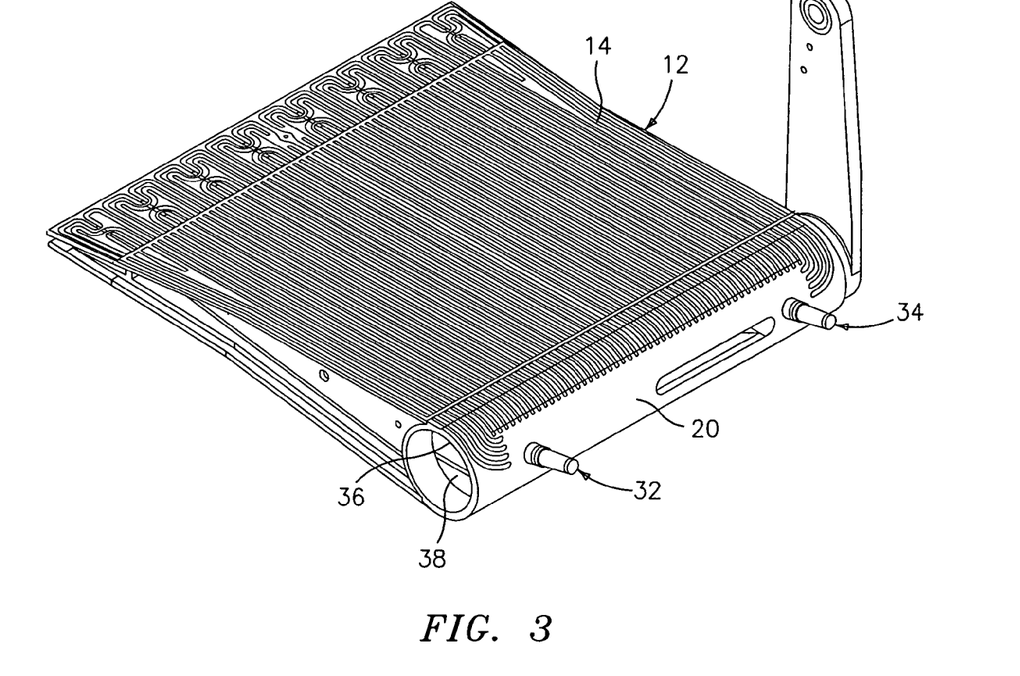
FIG. 3 is an isometric view of a cowl flap with the flowpath cooling channels exposed.
Figure 4:
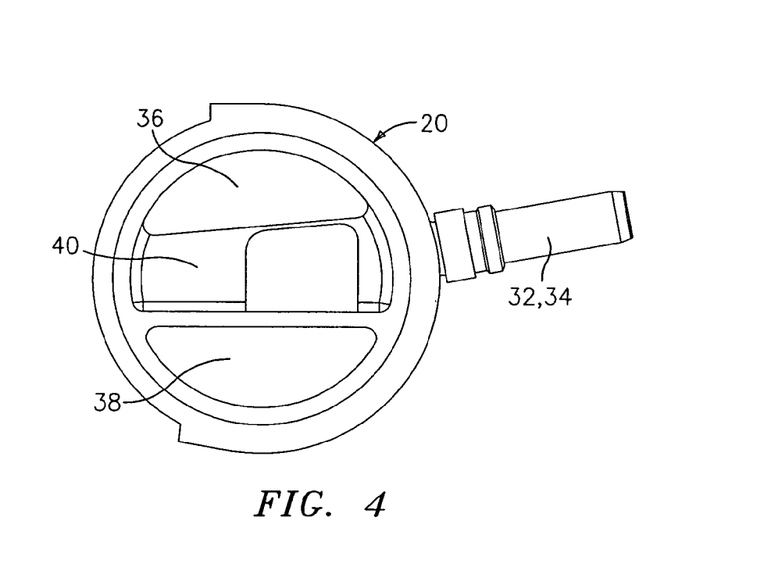
FIG. 4 is an end view of a torque tube used in the cooling scheme of the present invention.

In addition to being a structural member, the torque tube 20 features a geometry that allows its internal volume to double as both an inlet and exit coolant manifold 36 and 38 respectively (see FIGS. 3 and 4). Torque arms 22, which attach to opposite sides of the torque tube 20, are used to move the movable cowl inlet flap 12 through its intended range of motion. The movable cowl inlet flap 12 rotates on bearings 24 positioned on a cylindrical axis of the torque tube 20 and housed in the torque arms 22. Plumbing type fittings 26 located at the back of the torque tube 20 provide inlet and exit ports 32 and 34 respectively for coolant used to actively cool the movable cowl inlet flap 12. Flexible plumbing tubes (not shown) attach to the fittings 26 and carry coolant to and from the movable cowl inlet flap 12. Caps 28, located at both ends of the torque tube 20, form the sidewalls of the torque tube 20 and the manifolds 36 and 38. Due to the limited volume of the fixed cowl structure 30 behind the torque tube 20, the fittings 26 must be transversely aligned and positioned at a specific radial angle to accommodate the flap's range of motion. Properly positioned fittings prevent interference with surrounding hardware as the flap is articulated to its fully open or fully closed position.

FIG. 3 illustrates the cowl flap 12 with the flowpath cooling channels within the internal flowpath panel 14 exposed. Each of the panels 14 and 16 may have one or more cooling channels. As shown in FIG. 3, the panel 14, as well as the panel 16, preferably have a plurality of cooling channels.

In FIG. 3, both coolant inlet and exit fittings 32 and 34 respectively can be seen. Coolant enters and exits the flap cooling circuit exclusively through the fittings 32 and 34 via flexible tubing (not shown) attached to the fittings. The internal volume of the torque tube 20 is preferably split into a top manifold 36 and a bottom manifold 38 configuration. The top manifold 36 is used as a coolant supply manifold and the bottom manifold 38 is used as a return manifold. The volume restrictions behind the torque tube 20 dictate that the fittings 32 and 34 be aligned at the same radial angle. These restrictions make it difficult to find a solution that allows each fitting exclusive access to its intended manifold. Typically, the fittings 32 and 34 would be in a skewed configuration so as to be positioned directly opposite their respective manifolds. Since volume restrictions prohibit this, a solution has been devised which allows each fitting 32 and 34 to separately access its particular manifold. Additionally, space restrictions strictly limit maximum plumbing line diameters. These restrictions ordinarily negatively impact flow distribution characteristics within the coolant inlet manifold. However, internal features have been incorporated into the torque tube 20 to eliminate these adverse characteristics.

As can be seen from FIG. 4, the torque tube 20 has a top manifold 36 which acts as a coolant distribution/supply manifold and a bottom manifold 38 which acts as a collection/return manifold. This is accomplished by incorporating a partitioning wall 40 positioned approximately through the center of the tube 20. The wall 40 may be triangular in shape and roughly aligns with the angles of the fittings 32 and 34. The shape of the wall 40 should be such that it allows the fittings 32 and 34 exclusive access to their respective coolant manifolds 36 or 38 despite intersecting the torque tube 20 along the same radial plane.

Figure 5:
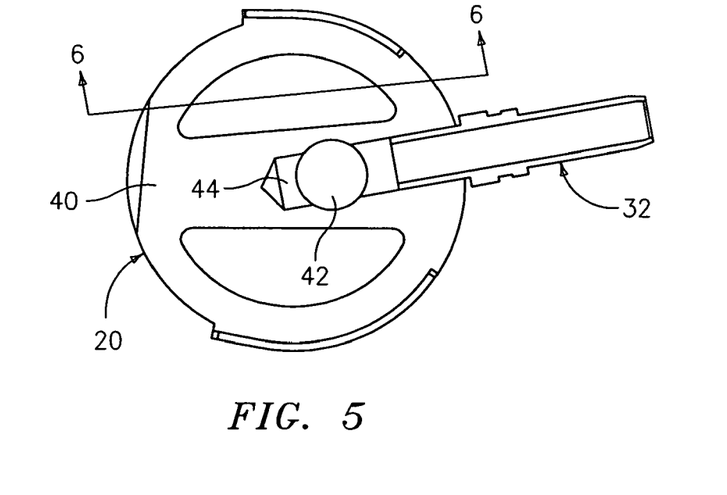
FIG. 5 is a cross sectional view of the torque tube of FIG. 4.

FIG. 5 is a cross sectional view of the torque tube 20 taken through the coolant inlet fitting 32. Coolant enters the torque tube 20 through the fitting 32 and is dispersed transversely through an internal channel 42 located within the wall 40. The fitting 32 has access to the internal channel 42 via a blind hole 44 penetrating the outside surface of the torque tube 20. The blind hole 44 is fabricated deep enough to intersect with the internal channel 42. The inlet fitting 32 is inserted into the blind hole 44 as shown in FIG. 5.

Figure 6:
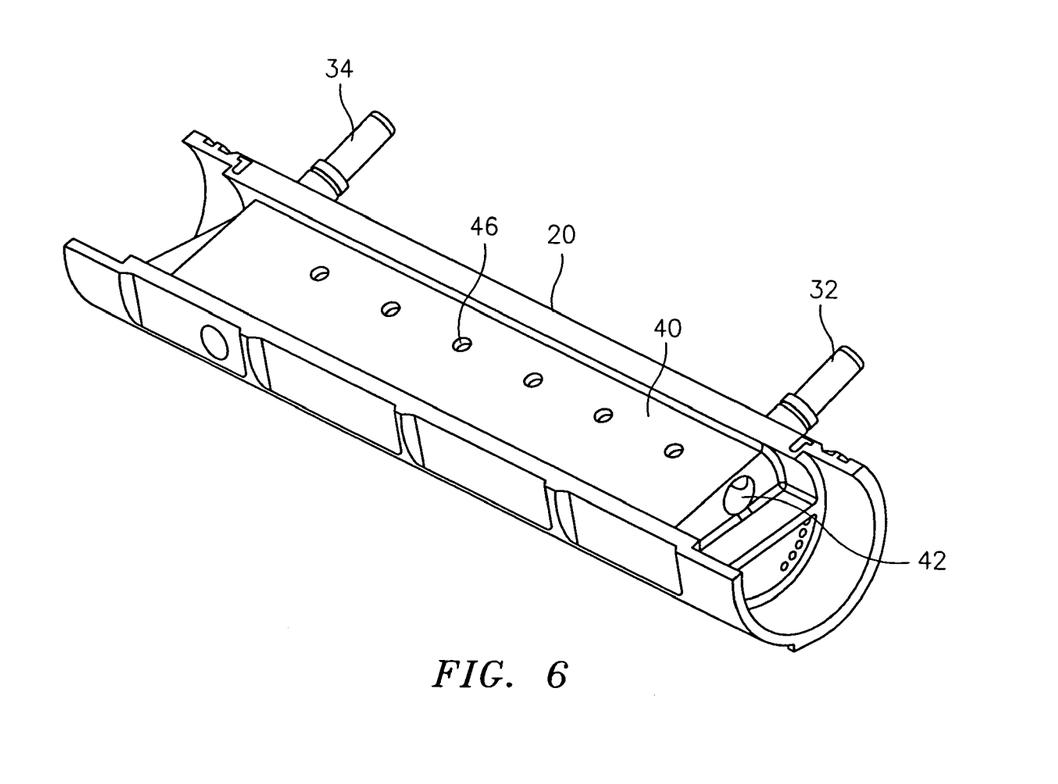
FIG. 6 is a sectional view taken along lines 6—6 of FIG. 5.

FIG. 6 is a sectional view through the inlet manifold 36. Coolant is dispersed into the inlet manifold volume through distribution holes 46 that intersect the internal channel 42. The spacing, size, quantity, and alignment of the distribution holes 46 are designed to provide substantially uniform, preferably uniform, coolant distribution within the manifold 36. Uniform distribution is desirable to ensure proper coolant delivery to the flowpath cooling channels.

Figure 7:
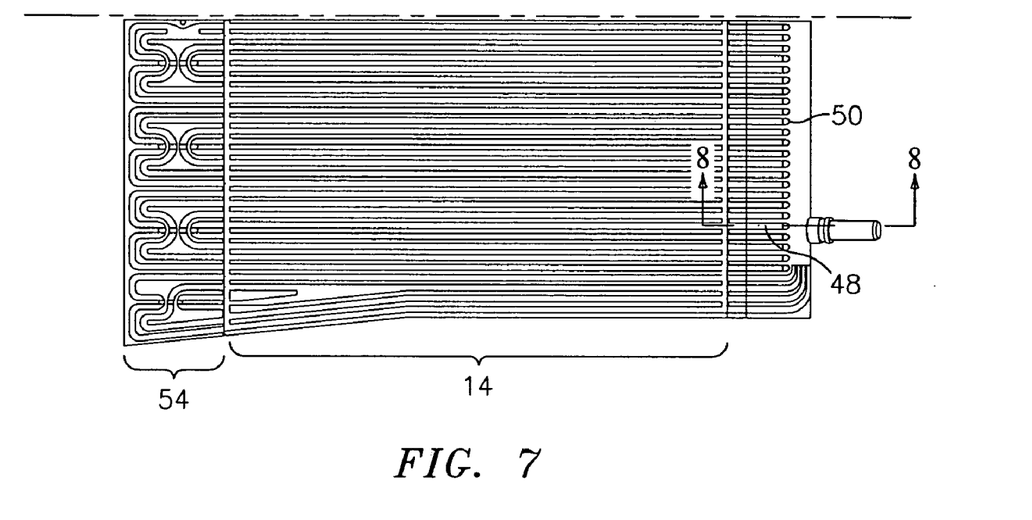
FIG. 7 is a top view of the cowl flap with the cooling channels exposed.
Figure 8:
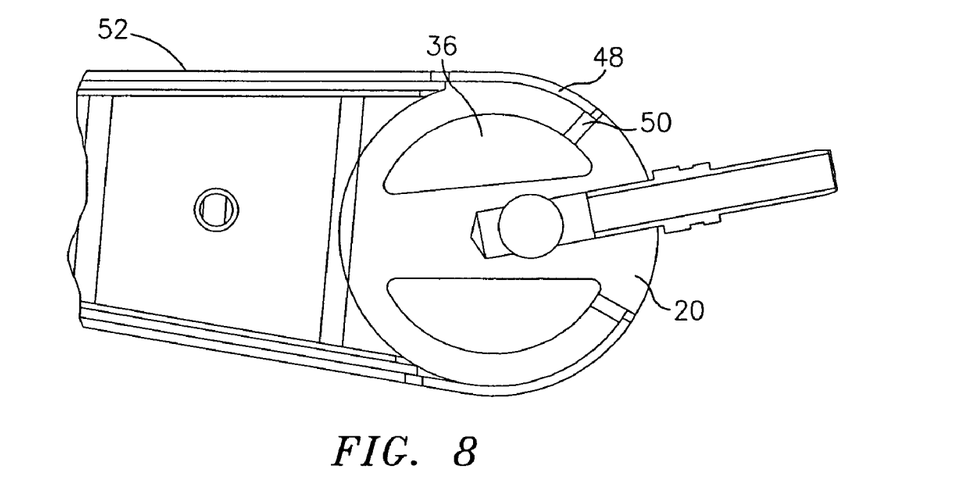
FIG. 8 is a side view of the flap with the torque tube.

Referring now to FIGS. 7 and 8, as the inlet manifold 36 fills, coolant is delivered to the inlet of each cooling channel 48 through a small hole 50 in the torque tube 20 at the base (initiation/termination) of each cooling channel 48. Once in the cooling channel 48, the coolant travels forward (away from the torque tube 20) through the flowpath panel 14 to the nose region 54 of the movable cowl inlet flap 12.

Figure 9:
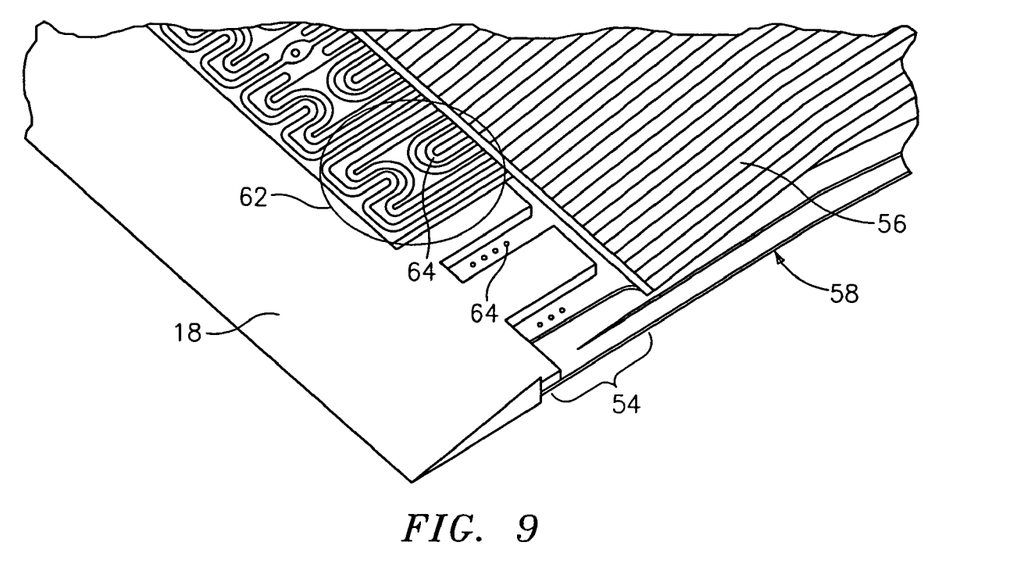
FIG. 9 is a view of the forward section of the cowl flap.

FIG. 9 illustrates the forward section of the flap 12 with a portion of the nose region 54 cut away. Coolant transfers from the internal flowpath panel 14 to the external flowpath panel 16 once it reaches the nose region 54. Since the nose region 54 also functions as a retaining feature for the composite leading edge 18, only specific locations are available for the coolant to transfer between the cooling channels in the panels 14 and 16. This is done via cooling passageways 62. The cooling passageways 62 allows the coolant from a plurality of cooling channels to gather at a central location. Coolant then transfers from one side to the other side via coolant transfer holes 64. Once on the external side, the coolant is dispersed in the same manner as it was collected. From here, the coolant travels aft through the cooling channels of the external panel 16 and is delivered back into the torque tube 20 in the same fashion as it was delivered. Cooling channel geometry in the external panel 16 of the flap 12 is preferably identical to that in the internal panel 14 of the flap 12.

Figure 10:
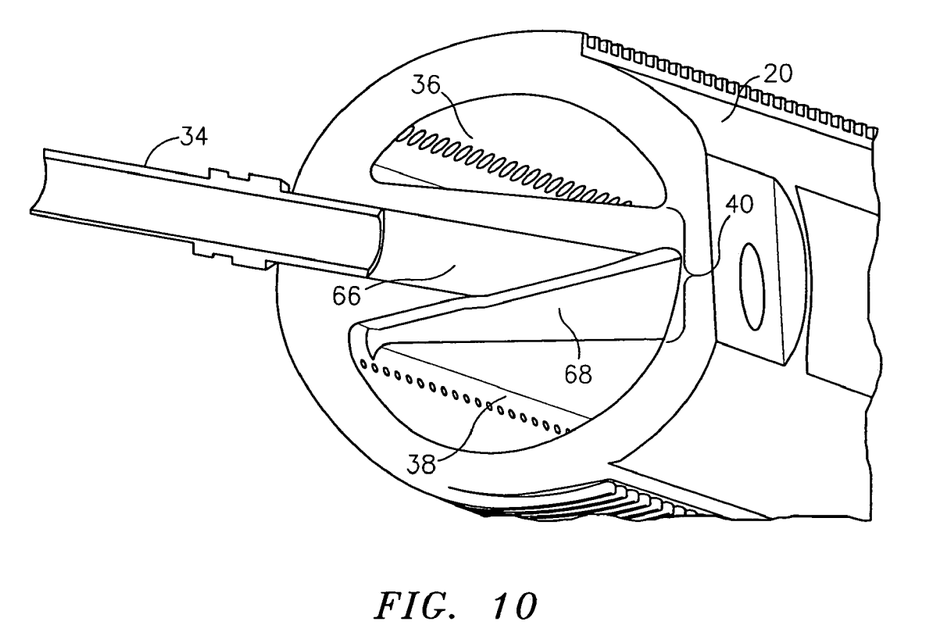
FIG. 10 is an isometric view of the torque tube used in the cooling scheme of the present invention.

FIG. 10 provides further details of the torque tube 20 at the exit fitting 34 location. As coolant collects in the exit manifold 38, it flows out through the exit fitting 34. The exit fitting 34 gains access to the exit manifold 38 through a blind hole 66 drilled into the partition wall 40. Local machining in area 68 on the bottom side of the wall 40 opens up fitting access to the volume of the exit manifold 38 without penetrating the inlet manifold 36. The access may be one or more holes located in the area 68.

Figure 11:
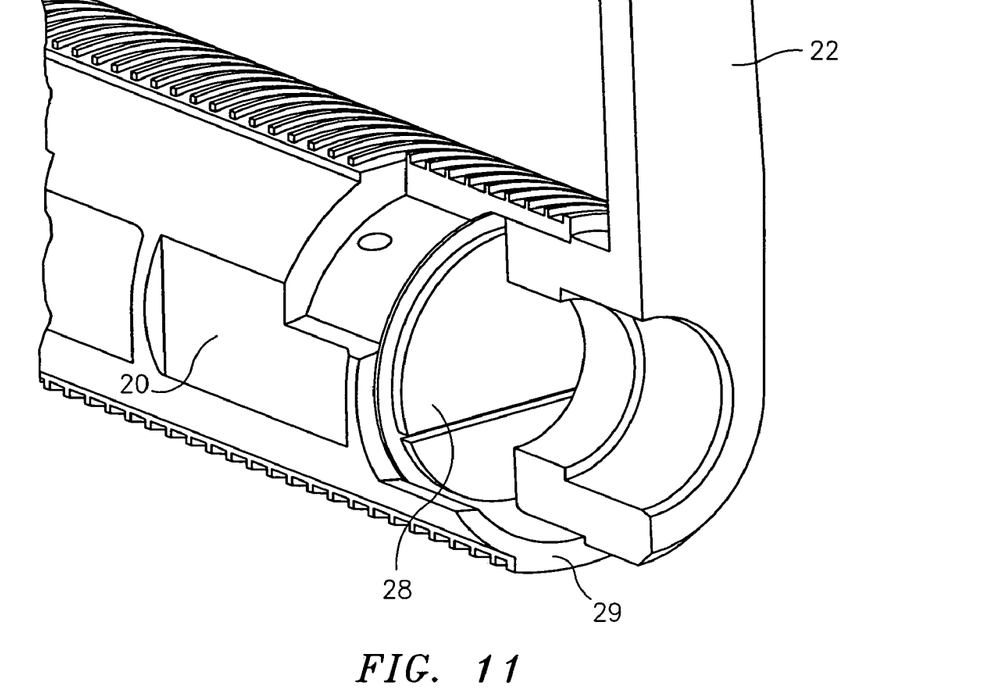
FIG. 11 is an isometric view of the torque tube of FIG. 10.

Referring now to FIG. 11, sheet metal caps 28 weld in place at each end of the torque tube 20. As previously discussed, these end caps 28 form the sidewalls of the manifolds 36 and 38. Each cap 28 is located roughly an inch inboard from an outside edge 29 of the torque tube 20. Locating the caps 28 inboard creates a cavity which may be used for installation of the torque arm 22. This approach to torque arm attachment prevents the entire length of the torque tube 20 from being used as a manifold. As a result, a special outer channel geometry has been developed to directly feed and collect coolant from the outermost cooling channels.

Figure 12:
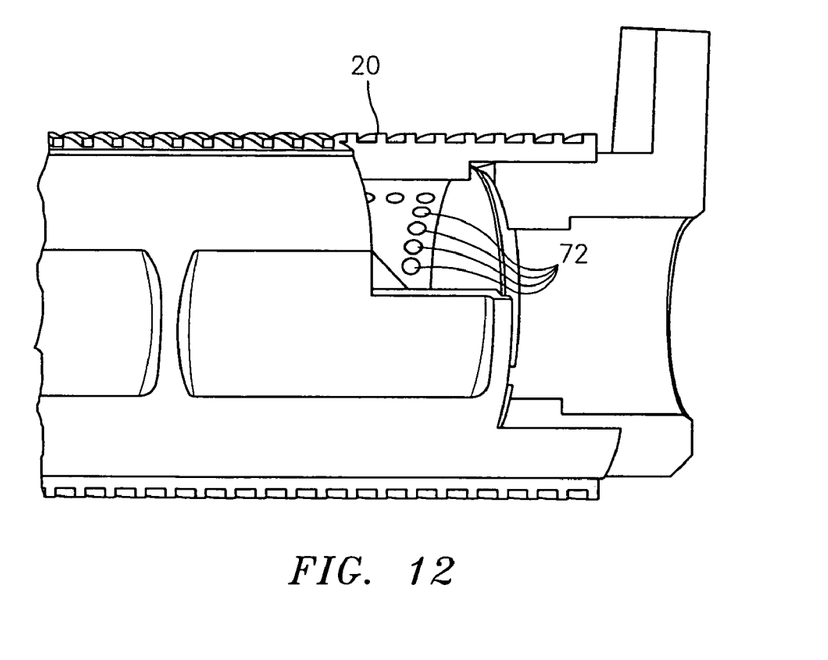
FIG. 12 is a sectional view of the torque tube of FIG. 10.
Figure 13:
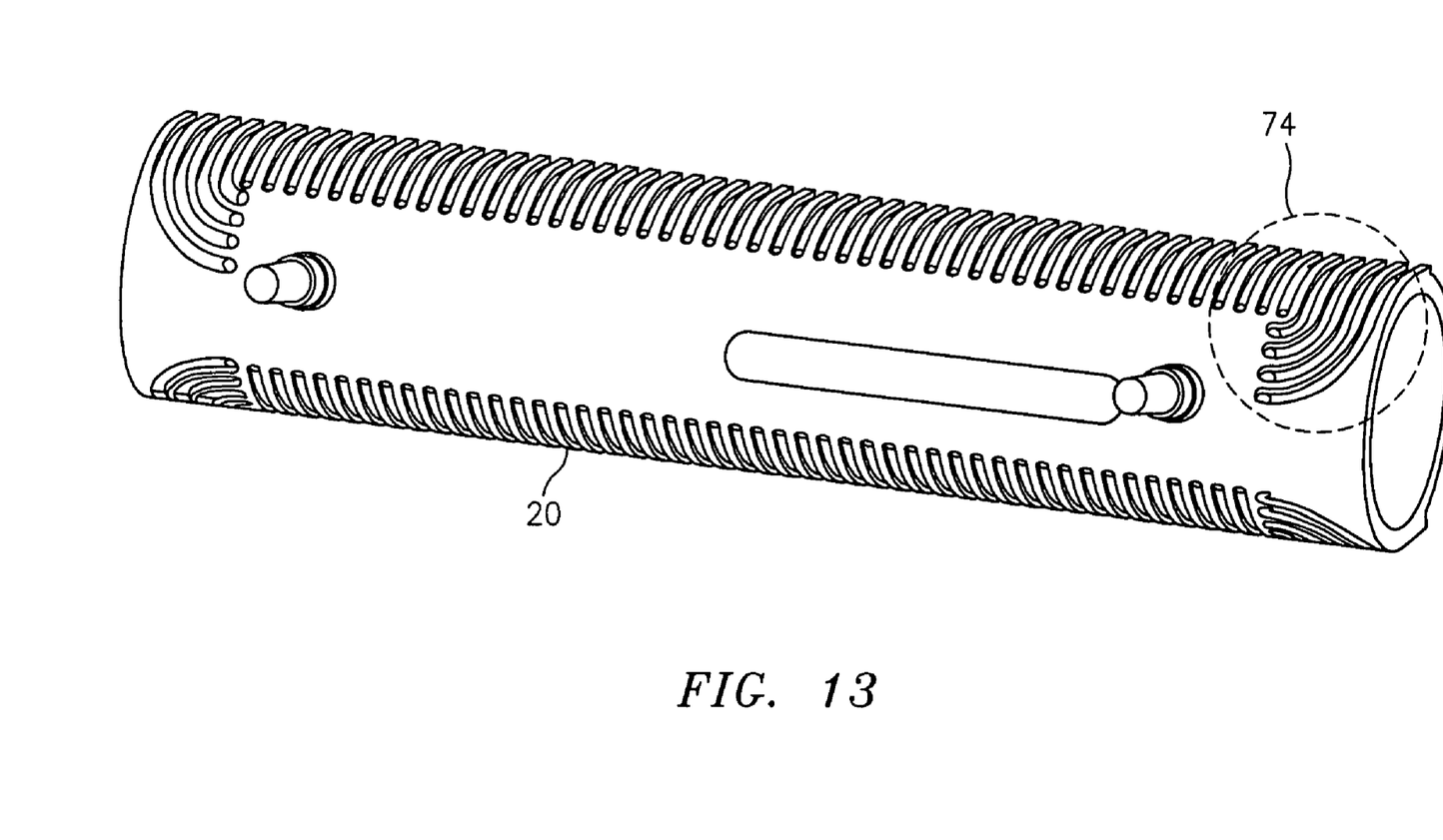
FIG. 13 is a perspective view of the torque tube of FIG. 10.

Referring now to FIGS. 12 and 13, each of the manifolds 36 and 38 is provided with feed holes 72 for communicating with the outermost coolant channels 74. A set of feed holes 72 may be located at each outer end of the manifolds 36 and 38. The feed holes 72 in the supply manifold 36 form the inlets for the outer coolant channels 74 communicating with the supply manifold 36 so that coolant may be supplied to these channels. The feed holes 72 in the collection/return manifold 38 form the outlets for the outer coolant channels 74 delivering coolant to the collection/return manifold 38. As can be seen from these figures, this arrangement allows coolant from the supply manifold 36 to be distributed to the outermost cooling channels on each side of the internal panel 14 and allows coolant to be received in the collection/return manifold 38 from the outermost cooling channels in the external panel 16.

The principal advantage to the cooling scheme or system of the present invention is that coolant flow distribution and collection through the flap is uniform across all cooling channels with no stagnant or cooling starved areas.

While the cooling scheme or system of the present invention has been described in the context of cooling a movable inlet cowl flap used in a scramjet engine, the cooling scheme or system could be used on a wide range of movable propulsion hardware requiring active cooling.

It is apparent that there has been provided in accordance with the present invention a cooling scheme for scramjet variable geometry hardware which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A scramjet engine comprising:
   a movable cowl inlet flap having an actively cooled internal panel and an actively cooled external panel;
   each of said internal panel and said external panel having at least one cooling channel;
   a torque tube forming a structural component of said flap;
   a first manifold within said torque tube for supplying coolant to said at least one cooling channel in said internal panel; and
   a second manifold within said torque tube for collecting coolant from said at least one cooling channel in said external panel.

2. A scramjet engine according to claim 1, wherein said first manifold is separated from said second manifold by a partition wall.

3. A scramjet engine according to claim 2, further comprising a transverse fluid channel within said partition wall and said fluid channel being in fluid communication with said first manifold via a plurality of distribution holes.

4. A scramjet engine according to claim 3, further comprising a first blind hole in said partition wall and a coolant inlet fitting positioned within said first blind hole so that fluid entering through said fitting can flow into said fluid channel.

5. A scramjet engine according to claim 4, further comprising a second blind hole in said partition wall and a coolant exit fitting positioned within said second blind hole, which coolant exit fitting is in fluid communication with said second manifold.

6. A scramjet engine according to claim 5, wherein said coolant inlet fitting and said coolant exit fitting are positioned at the same radial angle.

7. A scramjet engine according to claim 1, wherein said flap has a nose region and a plurality of transfer holes positioned within said nose region to allow coolant from said at least one cooling channel in said internal panel to flow into said at least one cooling channel in said external panel.

8. A scramjet engine according to claim 1, wherein said flap has a leading edge formed from a passively cooled composite structure.

9. A scramjet engine according to claim 1, further comprising torque arms for imparting movement to said flap.

10. A movable flap element for a scramjet comprising:
    an actively cooled internal panel and an actively cooled external panel;
    each of said internal panel and said external panel having at least one cooling channel;
    a torque tube forming a structural component of said flap;
    a first manifold within said torque tube for supplying coolant to said at least one cooling channel in said internal panel; and
    a second manifold within said torque tube for collecting coolant from said at least one cooling channel in said external panel.

11. A movable flap element according to claim 10, further comprising said first manifold being separated from said second manifold by a partition wall.

12. A movable flap element according to claim 11, further comprising a transverse fluid channel within said partition wall and said fluid channel being in fluid communication with said first manifold via a plurality of distribution holes.

13. A movable flap element according to claim 12, further comprising a first blind hole in said partition wall and a coolant inlet fitting positioned within said first blind hole so that fluid entering through said fitting can flow into said fluid channel.

14. A movable flap element according to claim 13, further comprising a second blind hole in said partition wall and a coolant exit fitting positioned within said second blind hole, which coolant exit fitting is in fluid communication with said second manifold.

15. A movable flap element according to claim 14, wherein said coolant inlet fitting and said coolant exit fitting are positioned at the same radial angle.

16. A movable flap element according to claim 10, wherein said flap element has a nose region and a plurality of transfer holes positioned within said nose region to allow coolant from said at least one cooling channel in said internal panel to flow into said at least one cooling channel in said external panel.

17. A movable flap element according to claim 10, wherein said flap element has a leading edge formed from a passively cooled composite structure.

18. A movable flap element according to claim 10, further comprising said torque tube having opposed outer ends, and caps welded to said torque tube for forming sidewalls for said first and second manifolds.

19. A movable flap element according to claim 18, wherein each said cap is positioned inboard of a respective one of said outer ends so as to form a space for allowing installation of a plurality of torque arms for imparting movement to said flap element.

20. A movable flap element according to claim 10, wherein each of said panels has a plurality of outermost channels and said torque tube has a plurality of feed holes for communicating with said outermost channels.

* * * * *